United States Patent
Katariya et al.

(10) Patent No.: US 8,981,702 B2
(45) Date of Patent: Mar. 17, 2015

(54) AUTOMATED MOTOR CONTROL

(71) Applicant: Texas Instruments Incorporated, Dallas, TX (US)

(72) Inventors: Ashish S. Katariya, Atlanta, GA (US); David P. Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 242 days.

(21) Appl. No.: 13/833,746

(22) Filed: Mar. 15, 2013

(65) Prior Publication Data
US 2014/0265952 A1    Sep. 18, 2014

(51) Int. Cl.
*H02P 21/14*    (2006.01)
*H02P 21/00*    (2006.01)

(52) U.S. Cl.
CPC ................ *H02P 21/0003* (2013.01)
USPC ................. 318/618; 318/400.04; 318/400.01; 318/700; 318/400.14; 318/400.07; 318/400.02

(58) Field of Classification Search
USPC ............... 318/400.02, 400.01, 700, 619, 800, 318/400.23
See application file for complete search history.

(56) References Cited

U.S. PATENT DOCUMENTS

| | | | | |
|---|---|---|---|---|
| 4,908,556 | A * | 3/1990 | Daggett et al. | 318/568.2 |
| 5,990,645 | A * | 11/1999 | Nakamura et al. | 318/432 |
| 6,639,380 | B2 * | 10/2003 | Sul et al. | 318/727 |
| 8,803,466 | B2 * | 8/2014 | Yoshiura et al. | 318/600 |
| 2011/0285332 | A1 * | 11/2011 | Pollock et al. | 318/400.02 |
| 2014/0265962 | A1 * | 9/2014 | Gebregergis et al. | 318/400.23 |

* cited by examiner

*Primary Examiner* — Rita Leykin
(74) *Attorney, Agent, or Firm* — John R. Pessetto; Frank D. Cimino

(57) ABSTRACT

Input-output linearization (IOL) and extended state observer (ESO) techniques are applied to a Field Oriented Control (FOC) for Permanent Magnet Synchronous Motors (PMSM). In one such approach, at least one gain value is determined based at least in part on a given bandwidth value. Operating parameters for the motor are determined based on the at least one gain value and information from a current sensor regarding motor current. Control signals used to the control the motor are determined based on the determined operating parameters. Accordingly, automated control can be effected through setting a bandwidth value through the implementation of IOL and ESO techniques.

18 Claims, 6 Drawing Sheets

AUTOMATED MOTOR CONTROL

TECHNICAL FIELD

This invention relates generally to electric motor controllers, and more specifically to controlling electric motors with an improved automation aspect.

BACKGROUND

Electric motors of various kinds are well known. Generally speaking, electric motors are driven by applying a current to inputs of the motor, which currents create a magnetic field that interacts with another magnetic field to turn the motor's rotor. For example, one or more permanent magnets can provide magnetic fields to interact with the magnetic fields produced by the input current. The motor's turning can be controlled by controlling various aspects of the current applied to the motor.

Motors come in a variety of designs. A common design includes having three windings of wires through which current flows, which current flow creates magnetic fields that interact with a plurality of permanent magnets. To control a motor with a complicated design, the current control may need a complicated and automated pattern that may be changed based on feedback regarding the motor's operation.

Many of today's motor control systems (as may be used with motors used in washing machines, electronic bicycles, manufacturing applications, and any other automated motor control) contain speed and current controllers that contain parameters that must be tuned manually to achieve the desired level of system performance. Performance is usually measured in terms of the controller's disturbance rejection properties, its robustness against parameter uncertainty, and settling times. However, tuning controllers manually can be time consuming and tedious given a large application space such as motor control because motors are applied in a wide variety of applications having different motor control needs. Moreover, tuning controller parameters for a particular application does not imply that the same parameters will give desired system performance for a different application. Changing applications often degrades robustness and disturbance rejection properties of the controller. Also, many applications require control systems expertise that is often not available to software engineers that develop microcontroller based motor control solutions.

In one approach known in the art, Field Oriented Control (FOC) is used for Permanent Magnet Synchronous Motors (PMSM). Such motors have non-linear characteristics, and one way to control such motors is to linearize the characteristics and apply linear controls. The general control flow in traditional Proportional Integral (PI)-based field oriented control is shown in FIG. 1. Usage of PIs requires manual tuning of six gains ($k_p$ and $k_i$ for each of three PIs) to achieve desired system performance. These gains are usually found by laboratory testing. Also, there is no closed form solution to specify desired controller bandwidth (the amount of computation capability for a controller when controlling a motor) while using this approach.

In other general dynamic systems or contexts, FOC is applied using simplified and/or special input-output linearization (IOL) and extended state observer (ESO) techniques. This simplified version is called Active Disturbance Rejection Control (ADRC). Application of this approach to PMSM contexts has certain limitations. For example, applications of ADRC in this context have either used first-order ADRC for speed and PIs for $i_d$ and $i_q$ or first-order ADRCs for speed, $i_d$ and $i_q$. However, there is no need to cascade two control systems for speed and $i_q$. Unnecessarily increasing the number of controllers not only increases complexity in gain design but also degrades system performance.

SUMMARY

Generally speaking and pursuant to these various embodiments, input-output linearization (IOL) and extended state observer (ESO) techniques are applied to Field Oriented Control (FOC) for Permanent Magnet Synchronous Motors (PMSM). In one such approach, at least one gain value is determined based at least in part on a given bandwidth value. Operating parameters for the motor are determined based on the at least one gain value and information from a current sensor regarding motor current. Control signals used to control the motor are determined based on the determined operating parameters. Accordingly, automated control can be effected through setting a bandwidth value through the implementation of IOL and ESO techniques. Moreover, as compared to previous applications, the total number of controllers can be reduced. These and other benefits may become clear upon making a thorough review and study of the following detailed description.

BRIEF DESCRIPTION OF THE DRAWINGS

The above needs are at least partially met through provision of the automated motor control described in the following detailed description and particularly when studied in conjunction with the drawings wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
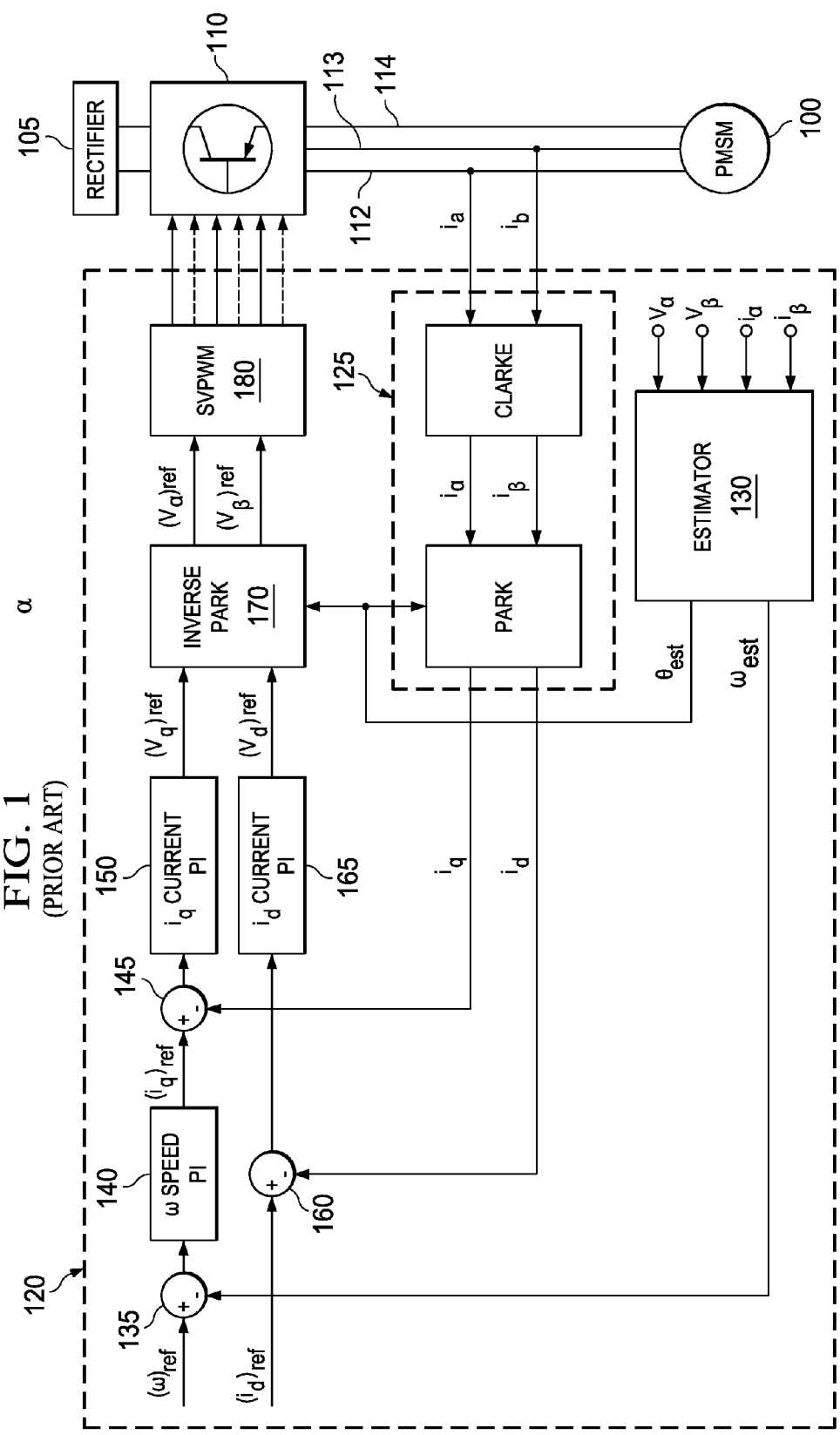
FIG. 1 comprises a schematic diagram for an example prior art approach to PMSM motor control.

Referring now to the drawings, and in particular to FIG. 1, a prior approach to motor control will be described to help illustrate the advances described herein. In FIG. 1, a PMSM 100 is controlled using a traditional PI-based field oriented control approach. A rectifier 105 provides power to an inverter 110. The inverter 110 includes various gates or switches to take power from the rectifier 105 and apply power to current paths 112, 113, 114 for the three windings of the motor 100. The inverter 110 is controlled by the receipt of control signals from a control device 120. Current for the motor 100 is sensed ($i_a$ and $i_b$) and transformed using the known mathematical transform, Clarke-Park transformation 125, to obtain feedback values $i_q$ and $i_d$. An estimator 130 takes available motor current ($i_\alpha$ and $i_\beta$) and applied voltage ($V_\alpha$ and $V_\beta$) values and outputs estimated rotor position $\theta_{est}$ and speed $\omega_{est}$. The estimated rotor position $\theta_{est}$ is used in the Park transformations. The estimated speed $\omega_{est}$ is compared 135 to a reference speed $\omega_{ref}$ to determine variance from the reference speed $\omega_{ref}$. The variance is applied to a speed proportional integral (PI) computation 140 to determine a reference current value $(i_q)_{ref}$ that relates to speed. This speed related reference current value $(i_q)_{ref}$ is compared 145 to the current feedback value $i_q$ from the Clarke-Park transformation 125 to determine a variance, which is provided to an $i_q$ current proportional integral (PI) computation 150 to determine a reference voltage value $(V_q)_{ref}$ to use to control the motor.

Similarly, current information $i_d$ from the Clarke-Park transformation 125 is compared 160 to a reference current $(i_d)_{ref}$ to determine variance from the reference current $(i_d)_{ref}$. The variance is provided to an $i_d$ current proportional integral (PI) computation 165 to determine a reference voltage value $(V_d)_{ref}$ to use to control the motor. The voltage reference values $(V_q)_{ref}$ and $(V_d)_{ref}$ are input to an inverse Park transformation 170 to obtain voltage values $(V_\alpha)_{ref}$ and $(V_\beta)_{ref}$ used by a pulse width modulator 180 that uses these values to output control signals for the inverter 110.

In a general case, a general second-order dynamic system, such as a motor, can be represented as $$\ddot{y} = f(y, \dot{y}, w, t) + bu$$

where b is a constant in terms of system parameters, u(t) is the system control input, w(t) is an external disturbance, y are the system states, and t is time. Representing the above system in the extended state-space form, where $$\dot{x}_1 = x_2$$

$$\dot{x}_2 = x_3 + bu$$

$$\dot{x}_3 = h,$$

the ADRC control law is given by $$u = \frac{k_1(r - \hat{x}_1) - k_2 \hat{x}_2 - \hat{x}_3}{b}$$

where $x_3 = f$, $h = \dot{f}$ and r is the reference command or set point for $x_1$ i.e. y. However, the IOL control law used in various approaches of this disclosure is given by $$u = \frac{k_1(r - \hat{x}_1) + k_2(\dot{r} - \hat{x}_2) + (\ddot{r} - \hat{x}_3)}{b(t)}.$$

Note that in the IOL control law, b is not necessarily a constant, and can be a time-varying coefficient depending on other state variables. Allowing for a time-varying coefficient b provides better tracking performance and also accounts for general non-linear systems that are not affine in the control input, u. However, it should be made sure that b is never exactly equal to zero in the transient sense. This would cause a singularity in the control law and make the system unstable. Also, note that the IOL control law introduces the usage of derivatives of the reference command, r for better tracking performance. The ADRC control law ignores these derivatives to avoid differentiation of set points on a microcontroller. However, this problem can be solved by implementing a smooth reference profile generator (for example, cam profile equations) to ensure that the derivative components are smooth as well.

Each PI controller in the traditional approach can be replaced by a first-order ADRC or IOL controller. To this end, the (IOL+ESO) approach presented in this document implements a single second-order IOL controller for speed and $i_q$, and a first-order IOL controller for $i_d$. Hence, the total number of controllers decreases from three to two. Moreover, the (IOL+ESO) approach is a more general approach and achieves better performance. Additionally, an exact discrete-time equivalent of an (IOL+ESO) control system approach for Field Oriented Control of a PMSM can then be used for implementation of the system on a microcontroller whereas the ADRC approach only used an approximate discrete time equivalent.

Figure 2:
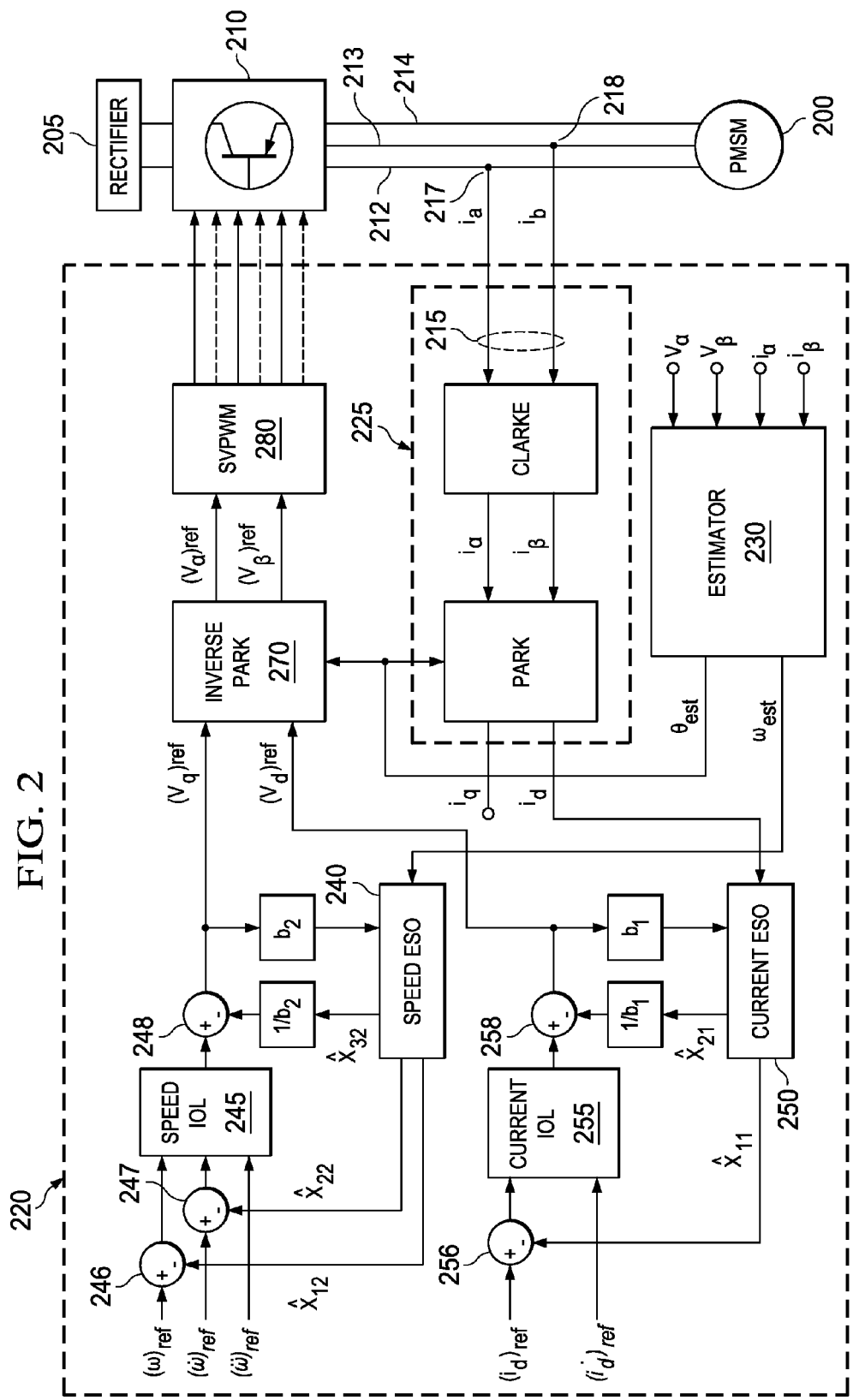
FIG. 2 comprises a schematic diagram of an example approach to motor control as configured in accordance with various embodiments of the invention.

One such approach to will be described with reference to FIG. 2. A PMSM 200 is controlled is this example via a rectifier 205 providing power to a motor power supply 210. The motor power supply 210 includes various gates or switches to take power from the rectifier 205 and apply power to current paths 212, 213, 214 for the three windings of the motor 200. An input 215 is configured to receive information from at least one current sensor 217, 218 configured to sense current in at least one current path 212, 213, 214 to the permanent magnet synchronous motor 200. A processing device 220 is connected to receive the information from the input 215 regarding the current $i_a$, $i_b$ in the at least one current path 212, 213 and configured to send signals to control operation of the permanent magnet synchronous motor 200. In the illustrated example, the processing device 200 is configured to model the motor operation using the illustrated controllers and passing data as indicated to use bandwidth and motor current values to provide feedback control.

To understand the operations of the various illustrated modules, the derivation of mathematical models that describe the operation of the controllers will now be described. To create an input-output linearization with extended state observer model for a PMSM, the modeling starts with the differential-equation model of a PMSM in d-q reference frame as given by:

$$\frac{d\theta_r}{dt} = \omega_r \quad (1)$$

$$\frac{d\omega_r}{dt} = \frac{1}{J}[T_e - T_f - T_l] \quad (2)$$

$$\frac{di_d}{dt} = \frac{1}{L_d}[v_d - Ri_d + P\omega_r L_q i_q] \quad (3)$$

$$\frac{di_q}{dt} = \frac{1}{L_q}[v_q - Ri_q - P\omega_r L_d i_d - P\omega_r \lambda_{af}] \quad (4)$$

and the electromagnetic torque, $T_e$, is given by $$T_e = \frac{3}{2}P[\lambda_{af} + (L_d - L_q)i_d]i_q = K_T(i_d, t)i_q. \quad (5)$$

A list of symbol definitions as used in this model is provided later in this disclosure. Note that when $i_d=0$, $$\lambda_{af} = \frac{2K_T}{3P},$$

where $K_T$ is the torque constant usually given in motor datasheets. The differential-equation model can be represented in state-space form by making the following state-variable assignments:

$x_1(t)=\theta_r=$Mechanical rotor position
$x_2(t)=\omega_r=$Mechanical rotor speed
$x_3(t)=i_d=$d-axis current
$x_4(t)=i_q=$q-axis current
$u_1(t)=v_d=$d-axis voltage
$u_2(t)=v_q=$q-axis voltage
$y_1(t)=i_d$
$y_2(t)=\omega_r$.

The above state-variable assignment demonstrates that the control inputs to the system are $v_d$ and $v_q$, and the control variables to be regulated by the use of reference commands are $i_d$ and $\omega_r$.

Because two variables need to be controlled, it calls for the development of two separate (IOL+ESO) controllers that exhibit decoupling control. Likewise, $v_d$ will be used to control $i_d$ and $v_q$ will be used to control $\omega_r$. The control system that regulates $i_d$ will be referred to as the current controller, whereas the system that regulates $\omega_r$ will be referred to as the speed controller.

Consider differential-equation (3) from the above PMSM model because $i_d$ is one of the variables to be controlled, $$\frac{di_d}{dt} = \frac{1}{L_d}[-Ri_d + P\omega_r L_q i_q] + \frac{1}{L_d}v_d$$

Making the respective state-variable assignments shown above, the above equation can be written as $$\dot{y}_1 = f_1(x_2, x_3, x_4) + b_1 u_1 \quad (6)$$

where $f_1$ is a function of the designated state-variables and other motor parameters and $$b_1 = \frac{1}{L_d}.$$

Note that equation (6) for the plant is in input-output form, and hence it can be modified to be represented in extended state-space form before an IOL control law and ESO can be developed for the system. Reassigning state-variables for the development of an (IOL+ESO) controller, the above plant model can be represented in state-space form as $$\dot{x}_{11} = x_{21} + b_1 u_1$$

$$\dot{x}_{21} = h_1$$

$$y_1 = x_{11} = x_3 = i_d$$

where $x_{21}=f_1$ and $h_1=\dot{f}_1$. The extended state observer for the above system is given by $$\dot{\hat{x}}_{11} = \hat{x}_{21} + l_{11}(x_{11} - \hat{x}_{11}) + b_1 u_1$$

$$\dot{\hat{x}}_{21} = l_{21}(x_{11} - \hat{x}_{11})$$

and the input-output linearization control law is given by $$u_1 = \frac{k_{11}(r_1 - \hat{x}_{11}) + (\dot{r}_1 - \hat{x}_{21})}{b_1}$$

where $l_{11}$ and $l_{21}$ are the observer gains, $k_{11}$ is the controller gain and $r_1$ is the reference command for $x_{11}$, i.e., $i_d$.

Now, consider differential-equation (2) from the PMSM model for development of the speed controller, $$\frac{d\omega_r}{dt} = \frac{1}{J}\left[\frac{3}{2}P[\lambda_{af} + (L_d - L_q)i_d]i_q - T_f - T_l\right].$$

Because $\dot{\omega}_r$ does not directly depend on the system inputs $v_d$ or $v_q$, a higher order of the same differential-equation can be considered for the development of (IOL+ESO) controller. Hence, $$\frac{d^2\omega_r}{dt^2} = f(\omega_r, i_d, i_q, v_d) + \frac{3P}{2JL_q}(\lambda_{af} + (L_d - L_q)i_d)v_q.$$

Making respective state-variable assignments, the above equation becomes $$\ddot{y}_2 = f_2(x_2, x_3, x_4, u_1) + b_2 u_2 \quad (7)$$

where $f_2$ is a function of the designated state-variables and other motor parameters, whereas $$b_2(t) = \frac{3P}{2JL_q}(\lambda_{af} + (L_d - L_q)i_d(t)).$$

Note that $b_2$ is a time-varying variable due to its dependence on $i_d$. Although $b_2$ is time-varying there is no singularity in the control law due to a constant term in the expression for $b_2(t)$. Also, note that effects due to $u_1$ are lumped into the non-linear unknown function, $f_2$ thus introducing decoupling control. Once again, because the plant equation is in input-output form, it can be converted to be represented in extended state-space form before an IOL control law and ESO can be developed for the system. Reassigning state-variables for the development of an (IOL+ESO) controller, the above plant model can be represented in state-space form as $$\dot{x}_{12} = x_{22}$$

$$\dot{x}_{22} = x_{32} + b_2 u_2$$

$$\dot{x}_{32} = h_2$$

$$y_2 = x_{12} = x_2 = \omega_r$$

where $x_{32} = f_2$ and $h_2 = \dot{f}_2$. The extended state observer for the above system is given by $$\dot{\hat{x}}_{12} = \hat{x}_{22} + l_{12}(x_{12} - \hat{x}_{12})$$

$$\dot{\hat{x}}_{22} = \hat{x}_{32} + l_{22}(x_{12} - \hat{x}_{12}) + b_2 u_2$$

$$\dot{\hat{x}}_{32} = l_{32}(x_{12} - \hat{x}_{12})$$

and the input-output linearization control law is given by $$u_2 = \frac{k_{12}(r_2 - \hat{x}_{12}) + k_{22}(\dot{r}_2 - \hat{x}_{22}) + (\ddot{r}_2 - \hat{x}_{32})}{b_2}$$

where $l_{12}$, $l_{22}$ and $l_{32}$ are the observer gains, $k_{12}$ and $k_{22}$ are the controller gains, and $r_2$ is the reference command for $x_{12}$, i.e., $\omega_r$.

So configured, through the development of two (IOL+ESO) controllers, measurements (as available in sensed FOC approaches) or estimates (as available in sensor-less FOC approaches) of only $i_d$ and $\omega_r$ are used in feedback; whereas, in traditional PI-based FOC, measurements or estimates of $i_d$, $\omega_r$ and $i_q$ are required in feedback. Also, only approximate values of $b_1$ and $b_2$ need to be known; the control system will have zero steady-state error even if exact values are not known.

The next step in control design is to enable bandwidth tuning of the (IOL+ESO) controllers through controller and observer gains. This is achieved via mathematical pole-placement. In this example, let $\omega_{c1}$ and $\omega_{o1}$ be the desired controller and observer bandwidths respectively for the current (IOL+ESO) system. Likewise, let $\omega_{c2}$ and $\omega_{o2}$ be the desired controller and observer bandwidths respectively for the speed (IOL+ESO) system. These desired bandwidths are typically received from a user or system designer.

For purposes of gain design and illustration, consider the speed controller and its third-order extended state observer shown above. Note that all equations for the speed controller bear the subscript 2, whereas equations for the current controller have subscript 1. The respective extended state-space form can be written as a linear system, $$\dot{x}_2 = A_2 x_2 + B_2 u_2 + E_2 h_2$$

$$y_2 = C_2 x_2$$

where $$A_2 = \begin{bmatrix} 0 & 1 & 0 \\ 0 & 0 & 1 \\ 0 & 0 & 0 \end{bmatrix},$$

$$B_2 = \begin{bmatrix} 0 \\ b_2 \\ 0 \end{bmatrix},$$

$$E_2 = \begin{bmatrix} 0 \\ 0 \\ 1 \end{bmatrix},$$

$$C_2 = \begin{bmatrix} 1 & 0 & 0 \end{bmatrix}.$$

If the observer gain matrix is given by $$L_2 = \begin{bmatrix} l_{12} \\ l_{22} \\ l_{32} \end{bmatrix},$$

the characteristic polynomial for the observer is given by $$\lambda_{o2}(s) = |det(sI - (A_2 - L_2 C_2))| = s^3 + l_{12} s^2 + l_{22} s + l_{32}.$$

Now, the observer gains are selected such that $\lambda_{o2}(s)$ is Hurwitz, meaning that all coefficients are positive and none are mathematically imaginary. This can be done by placing all poles at $-\omega_{o2}$ and thus enabling bandwidth tuning. Hence, $$\lambda_{o2}(s) = s^3 + l_{12} s^2 + l_{22} s + l_{32} = (s + \omega_{o2})^3$$

Comparing both equations above, $$l_{12} = 3\omega_{o2}, l_{22} = 3\omega_{o2}^2, l_{32} = \omega_{o2}^3.$$

Similarly, for the speed IOL control law, gains are selected such that the characteristic polynomial, $$\lambda_{c1}(s) = s^2 + k_{22} s + k_{12} = (s + \omega_c)^2$$

is Hurwitz and all poles are placed at $-\omega_c$. Once again, comparing the above equations, $$k_{12} = \omega_{c2}^2, k_{22} = 2\omega_{c2}.$$

Using a similar approach, gains can be designed for the lower-order current IOL and ESO. Gains that enable bandwidth tuning for both controllers and observers are summarized below.

$$l_{11} = 2\omega_{o1}, l_{12} = \omega_{o1}^2$$

$$k_{11} = \omega_{c1}$$

$$l_{12} = 3\omega_{o2}, l_{22} = 3\omega_{o2}^2, l_{32} = \omega_{o2}^3$$

$$k_{12} = \omega_{c2}^2, k_{22} = 2\omega_{c2}$$

It is common practice to design controllers with a desired bandwidth based on design objectives; however, choosing a bandwidth for the observers may pose a challenge. Through simulations and experimentation it is found that observer bandwidths may be specified using the following rule, $$\omega_o \approx 5 \sim 10 \omega_c.$$

Using the starting point above, the discrete-time equivalent of the control system is derived so that embedded implementation of the control system on a micro-controller is possible. All previous sections assumed that the developed controller is continuous in nature; whereas, this section makes the transition to a discrete version of the (IOL+ESO) controllers.

The discretization of the IOL control law is generally trivial; however, discretization of the ESO may pose some challenges. The discrete-time equivalents of the two IOL controls laws are given by:

$$u_1(k) = \frac{k_{11}(r_1 - \hat{x}_{11}(k)) + (\dot{r}_1 - \hat{x}_{21}(k))}{b_1}$$

$$u_2(k) = \frac{k_{12}(r_2 - \hat{x}_{12}(k)) + k_{22}(\dot{r}_2 - \hat{x}_{22}(k)) + (\ddot{r}_2 - \hat{x}_{32}(k))}{b_2}.$$

For the discretization of the ESO, first consider a general continuous-time plant of the form, $$\dot{x}(t) = Ax(t) + Bu(t)$$

$$y(t) = Cx(t)$$

The exact discrete-time equivalent of the above system is given by $$x(k+1) = A_d x(k) + B_d u(k)$$

$$y(k) = C_d x(k)$$

where $$A_d = e^{AT} = \mathcal{L}^{-1}\{(sI - A)^{-1}\}|_{t=T}$$

$$B_d = \int_0^T e^{An} B \, dn$$

$$C_d = C$$

and T is the sampling-time of the discrete-time system.

Now, consider the continuous-time current ESO represented in general form, $$\begin{bmatrix} \dot{\hat{x}}_{11}(t) \\ \dot{\hat{x}}_{21}(t) \end{bmatrix} = \begin{bmatrix} -l_{11} & 1 \\ -l_{21} & 0 \end{bmatrix} \begin{bmatrix} \hat{x}_{11}(t) \\ \hat{x}_{21}(t) \end{bmatrix} + \begin{bmatrix} b_1 & l_{11} \\ 0 & l_{21} \end{bmatrix} \begin{bmatrix} u_1(t) \\ i_d(t) \end{bmatrix}$$

In view of the above system of equations, for the current ESO in continuous-time, $$A_1 = \begin{bmatrix} -l_{11} & 1 \\ -l_{21} & 0 \end{bmatrix},$$

$$B_1 = \begin{bmatrix} b_1 & l_{11} \\ 0 & l_{21} \end{bmatrix}.$$

Using the discrete-time equivalent equations shown earlier and the relationship between observer gains and bandwidth shown above, the discrete version of the current ESO is given by $$\begin{bmatrix} \hat{x}_{11}(k+1) \\ \hat{x}_{21}(k+1) \end{bmatrix} = A_{d1} \begin{bmatrix} \hat{x}_{11}(k) \\ \hat{x}_{21}(k) \end{bmatrix} + B_{d1} \begin{bmatrix} u_1(k) \\ i_d(k) \end{bmatrix}$$

where $$A_{d1} = e^{-\omega_{o1}T} \begin{bmatrix} -\omega_{o1}T + 1 & T \\ -\omega_{o1}^2 T & \omega_{o1}T + 1 \end{bmatrix}$$

and $$B_{d1} = e^{-\omega_{o1}T} \begin{bmatrix} b_1 T & \omega_{o1}T - 1 + e^{\omega_{o1}T} \\ \omega_{o1}b_1 T + b_1 - b_1 e^{\omega_{o1}T} & \omega_{o1}^2 T \end{bmatrix}.$$

Similarly, the discrete version of the speed ESO is given by $$\begin{bmatrix} \hat{x}_{12}(k+1) \\ \hat{x}_{22}(k+1) \\ \hat{x}_{32}(k+1) \end{bmatrix} = A_{d2} \begin{bmatrix} \hat{x}_{12}(k) \\ \hat{x}_{22}(k) \\ \hat{x}_{32}(k) \end{bmatrix} + B_{d2} \begin{bmatrix} u_2(k) \\ \omega_r(k) \end{bmatrix}$$

where $$A_{d2} = e^{-\omega_{o2}T} \begin{bmatrix} 0.5\omega_{o2}^2 T^2 - 2\omega_{o2}T + 1 & -0.5\omega_{o2}^2 T^2 + T & 0.5T^2 \\ \omega_{o2}^3 T^2 - 3\omega_{o2}^2 T & -\omega_{o2}^2 T^2 + \omega_{o2}T + 1 & \omega_{o2}T^2 + T \\ 0.5\omega_{o2}^4 T^2 - \omega_{o2}^3 T & -0.5\omega_{o2}^3 T^2 & 0.5\omega_{o2}^2 T^2 + \omega_{o2}T + 1 \end{bmatrix}$$

and $$B_{d2} = e^{-\omega_{o2}T} \begin{bmatrix} 0.5 b_2 T^2 & -0.5\omega_{o2}^2 T^2 + 2\omega_{o2}T - \\ \omega_{o2}b_2 T^2 + b_2 T & 1 + e^{-\omega_{o2}T} \\ 0.5\omega_{o2}^2 b_2 T^2 + \omega_{o2}b_2 T + & -\omega_{o2}^3 T^2 + 3\omega_{o2}^2 T - 0.5\omega_{o2}^4 T^2 + \\ b_2 - b_2 e^{\omega_{o2}T} & \omega_{o2}^3 T \end{bmatrix}.$$

A reference profile generator is used to provide smooth time-varying reference commands for $r_1$, $\dot{r}_1$, $r_2$, $\dot{r}_2$ and $\ddot{r}_2$ where $r_1$ and $r_2$ are the reference commands for $i_d$ and $\omega_r$ respectively. Not using smooth reference commands may excite unstable dynamics in a system and cause the actuators to saturate or the system to go unstable. Because the second derivative of $r_2$ is used, the profile generator equations for $r_2$ are used, and the equations for $r_1$ then become clear. Let $(\omega_r)_{des}$ be the desired set point for rotor speed and $T_{des}$ be the absolute time within which the rotor speed, $\omega_r$ should reach $(\omega_r)_{des}$. The profile generator equations for $r_2$ are given by:

$$r_2(t) = (\omega_r)_{des} \left[ \frac{t}{T_{des}} - \frac{1}{2\pi} \sin \frac{2\pi t}{T_{des}} \right]$$

$$\dot{r}_2(t) = \frac{(\omega_r)_{des}}{T_{des}} \left[ 1 - \cos \frac{2\pi t}{T_{des}} \right]$$

$$\ddot{r}_2(t) = \frac{2\pi (\omega_r)_{des}}{T_{des}^2} \sin \frac{2\pi t}{T_{des}}.$$

Similar equations can be written for $r_1(t)$ and $\dot{r}_1(t)$ using the above structure.

Referring again to FIG. 2, in operation, the processing device 220 is to implement selected ones of the above equations to control the motor in corresponding modules. First, to obtain the information used in the equations for the illustrated example, the processing device 220 is configured to transform the sensed motor current ($i_a$ and $i_b$) using the known mathematical transform, Clarke-Park transformation 225, to obtain feedback values $i_q$ and $i_d$. Estimated values can also be used. An estimator 230 takes available motor current ($i_\alpha$ and $i_\beta$) and applied voltage ($V_\alpha$ and $V_\beta$) values and outputs estimated rotor position $\theta_{est}$ and speed $\omega_{est}$. The estimated rotor position $\theta_{est}$ is used in the Park transformations. The estimated speed $\omega_{est}$ is used in the ESO speed module 240. In addition to the estimated rotor position $\theta_{est}$, estimated speed $\omega_{est}$, and current value $i_d$, various reference values are received.

Those skilled in the art will recognize and appreciate that such a processor device 220 can comprise a fixed-purpose hard-wired platform or can comprise a partially or wholly programmable platform. All of these architectural options are well known and understood in the art and require no further description here. Moreover, those skilled in the art will recognize and understand that such an apparatus as illustrated in FIG. 2 may be comprised of a plurality of physically distinct elements as is suggested by the illustration. It is also possible, however, to view this illustration as comprising a logical view, in which case one or more of these elements can be enabled and realized via a shared platform. It will also be understood that such a shared platform may comprise a wholly or at least partially programmable platform as are known in the art.

In the illustrated example, the processing device 220 receives a bandwidth value $(\omega)_{ref}$ for example, through a user interface or as a value received from a separate program in communication with the processing device 220. Also, the processing device 220 may receive a reference current value $(i_d)_{ref}$ using similar methods. The processing device 220 is configured to determine at least one gain value based at least in part on the bandwidth value. In the approach described above for the ESO speed module 240, the processing device 220 is further configured to determine the at least one gain value based at least in part on the bandwidth value by selecting observer gains such that a characteristic polynomial for the extended state observer speed module 240 has all positive and real coefficients by placing all poles at an extended state observer bandwidth.

The processing device 220 is also configured to determine operating parameters for the motor 200 based at least in part on the at least one gain value and the information from the at least one current sensor 217, 218 regarding the current in the at least one current path 212, 213, 214 using field oriented control by applying input-output linearization with an extended state observer feedback, for example, through algorithmic implementation of the above described mathematical relationships. The operating parameters can be determined by the processing device's 220 implementing one second-order input-output linearization controller 245 to output a speed control value using a reference rotational speed and speed extended state observer feedback in combination with implementing a single-order input-output linearization controller 255 to output a current control value using a reference d-axis current, $(i_d)_{ref}$ and current extended state observer feedback. By one approach, the processing device 220 is further configured to implement the one second-order input-output linearization controller 245 to output a speed control value by receiving information regarding a reference speed and feedback from an extended state observer speed module 240 of the processing device 220. The information regarding the reference speed and ESO speed module 240 feedback in the illustrated example, includes the reference speed value $(\omega)_{ref}$ as compared 246 to a state variable $\hat{x}_{12}$ received from the ESO speed module 240, a first derivative of the reference speed value $(\dot{\omega})_{ref}$ as compared 247 to a state variable $\hat{x}_{22}$ received from the ESO speed module 240, and a second derivative of the reference speed value $(\ddot{\omega})_{ref}$. Moreover, in the illustrated example, the control value from the IOL speed module 245 is modified 248 using a state variable $\hat{x}_{32}$ received from the ESO speed module 240, which state variable is combined with the time varying control law coefficient $b_2$ as illustrated.

To provide such feedback, the processing device's 220 extended state observer speed module 240 is configured to receive feedback information regarding motor speed and control signals from the one second-order input-output linearization controller 245 and to provide extended state observer outputs as the feedback to the one second-order input-output linearization controller 245. In the example of FIG. 2, the information regarding motor speed received by the ESO speed module 240 includes the estimated speed $\omega_{est}$ from the estimator 230 whereas the control signals from the IOL speed controller 245 include the time varying control law coefficient $b_2$.

Furthermore, the processing device 220 is configured to implement the single-order input-output linearization controller 245 to output a current control value by receiving information regarding a reference current and feedback from an extended state observer current module. The information regarding the reference current includes, in the FIG. 2 example, a reference current, $(i_d)_{ref}$ received by the processing device 220 as compared 256 to a state variable $\hat{x}_{11}$ received from the ESO current module 250 and a first derivative of the reference current value $(\dot{i}_d)_{ref}$. By one approach, the processing device's 220 extended state observer current module 250 is configured to receive feedback information regarding d-axis current, $i_d$, and control signals from the single-order input-output linearization controller 255 and to provide extended state observer outputs as the feedback to the single-order input-output linearization controller 255. In the illustrated example, the control value from the IOL current module 255 is modified 258 using a state variable $\hat{x}_{21}$ received from the ESO current module 250, which state variable is combined with the time varying control law coefficient $b_1$ as illustrated. Also as illustrated in the example of FIG. 2, the control signals from the single-order IOL current controller 255 received by the ESO current module 250 include the time varying control law coefficient $b_1$.

The processing device 220 is further configured to effect sending control signals based on the operating parameters to a control circuit 210 to control operation of the motor 200. In the illustrated example, the above described processes result in a voltage reference value $(V_q)_{ref}$ from the speed control modules and the voltage reference value $(V_d)_{ref}$ from the current control modules. These values are input to an inverse Park transformation 270 to obtain voltage values $(V_\alpha)_{ref}$ and $(V_\beta)_{ref}$ used by a pulse width modulator 280 that uses these values to output control signals for the inverter 210.

So configured, a controller for such permanent magnet motors using a non-linear control approach called input-output linearization (IOL) with extended state observer (ESO) can have the following features: automated controller gain design via pole-placement, bandwidth tuning, improved disturbance rejection, improved robustness against parameter uncertainty, discrete-time equivalent of controller for embedded implementations, and implementation of a smooth reference profile generator.

A method 300 of controlling a PMSM will be described with reference to FIG. 3. The method includes receiving 305 by a processing device information from at least one current sensor regarding current in at least one current path to a permanent magnet synchronous motor and determining 310 by the processing device at least one gain value based at least in part on a bandwidth value. Determining the gain value may include selecting 312 observer gains such that a characteristic polynomial for an extended state observer speed module has all positive and real coefficients by placing all poles at an extended state observer bandwidth. In a further aspect, determining the gain value may include selecting 314 input-output controller gains such that a characteristic polynomial for an input-output linearization control module has all positive and real coefficients by placing all poles at an input-output linearization control module bandwidth.

The method further includes determining 315 by the processing device operating parameters for the permanent magnet synchronous motor based at least in part on the at least one gain value and the information from the at least one current sensor regarding the current in the at least one current path using field oriented control by applying input-output linearization with an extended state observer feedback. In one aspect, determining the operating parameters includes implementing 320 one second-order input-output linearization controller to output a speed control value using a reference rotational speed and speed extended state observer feedback. For example, implementing the one second-order input-output linearization controller may include receiving 322 information regarding a reference speed and feedback from an extended state observer speed module. In such an example, the extended state observer speed module receives 324 feedback information regarding motor speed and control signals from the one second-order input-output linearization controller and provides extended state observer outputs as the feedback to the one second-order input-output linearization controller.

In another aspect, determining the operating parameters includes implementing 325 a single-order input-output linearization controller to output a current control value using a reference d-axis current and current extended state observer feedback. For example, implementing the single-order input-output linearization controller to output a current control value may include receiving 327 information regarding a reference current and feedback from an extended state observer current module. In such an example, the extended state observer current module receives 329 feedback information regarding d-axis current and control signals from the single-order input-output linearization controller and provides extended state observer outputs as the feedback to the single-order input-output linearization controller.

Those skilled in the art will appreciate that the above-described processes are readily enabled using any of a wide variety of available and/or readily configured platforms, including partially or wholly programmable platforms as are known in the art or dedicated purpose platforms as may be desired for some applications. One such process is described above with reference to FIG. 2.

Figure 3:
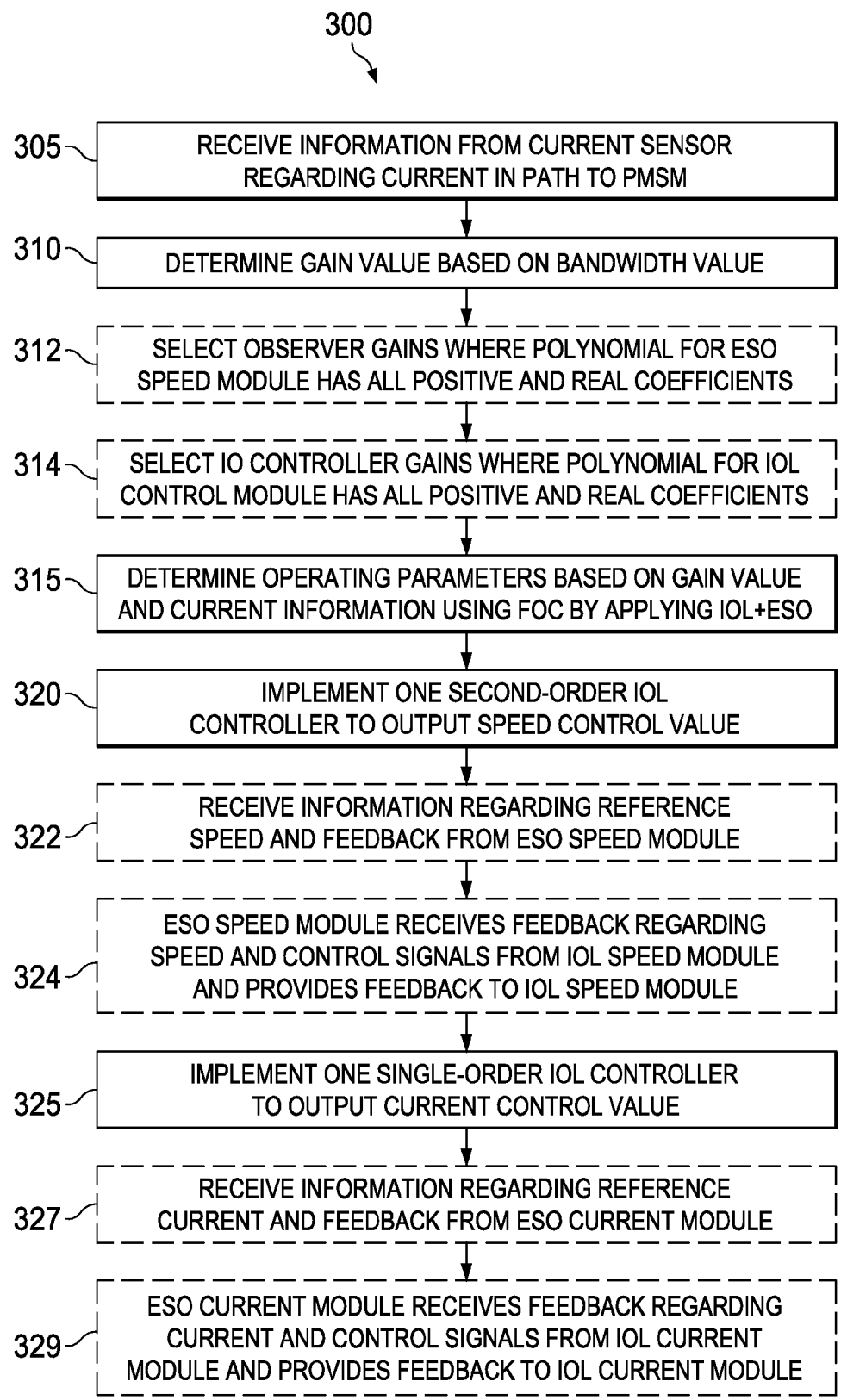
FIG. 3 comprises a flow diagram of an example method of motor control as configured in accordance with various embodiments of the invention.

In an additional alternative embodiment, the functionality or logic described in FIG. 3 may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

As described, the (IOL+ESO) based speed controller for Field Oriented Control of Permanent Magnet Synchronous Motors is capable of enhanced disturbance rejection and robustness against parameter uncertainties. For a PMSM, disturbances include $T_1$ and $T_f$ while motor parameters include J, R, $L_d$, $L_q$, P and $\lambda_{af}$. This controller also enables bandwidth tuning and automated gain design via pole-placement, thus eliminating the overhead of manual tuning for achieving desired system performance. An exact discrete-time equivalent of the (IOL+ESO) controller allows direct implementation on a microcontroller operatively connected to the motor. Also, a reference command profile generator generates smooth reference commands for the motor.

Aspects of the (IOL+ESO) control system for FOC of PMSM presented in this disclosure have been simulated and tested in SIMULINK simulation program. This includes disturbance rejection, robustness, gain design/bandwidth tuning via pole-placement, discretized controller acting on a continuous plant model and usage of smooth reference commands from a profile generator.

For purposes of simulation, motor parameters used for an 400 W motor are P=4, $L_d=L_q=13.3$ mH, R=4.7Ω, $$J = 0.62 \times 10^{-4} \frac{\text{kg}}{\text{m}^2},$$

$T_l$=0.5 N·m, $\lambda_{af}$=0.094 V·s, B=0.001 N·m·s where B is the friction coefficient and $T_f=B\omega_r$. The controller bandwidths are tuned such that there are minimal oscillations and overshoot when the above motor parameters and specifically $T_l$=0.5 N·m are used. Accordingly, the bandwidths used are $\omega_{c1}$=150 Hz, $\omega_{o1}$=10$\omega_{c1}$=1500 Hz $\omega_{c2}$=50 Hz, $\omega_{o2}$=10$\omega_{c2}$=500 Hz.

The sampling frequency for the discrete-time control system is 10 kHz. The motor is initialized from rest condition, i.e., initial conditions on $\omega_r$ and $i_d$ are both zero. The set point for rotor speed $\omega_r$ is 3000 rpm, which is reached using a smooth reference profile; whereas, $i_d$ is controlled such that it remains zero, i.e., reference command for $i_d$ is 0 Amp.

Figure 4:
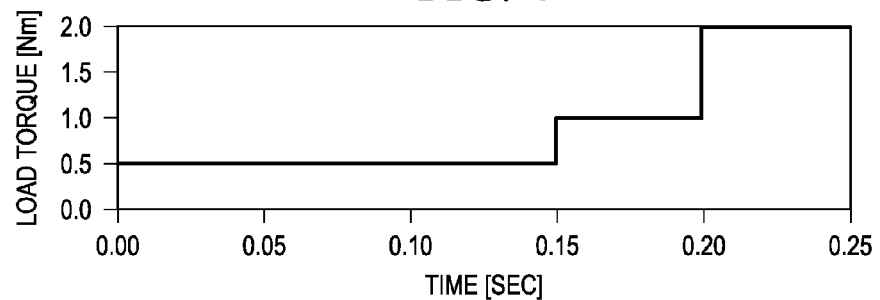
FIG. 4 comprises a diagram of a load torque profile for a disturbance rejection simulation of a motor control approach as configured in accordance with various embodiments of the invention.

The controller's disturbance rejection properties are demonstrated by first simulating the system under normal conditions (for which the controller was designed), and then introducing disturbances to check if the system is stable with zero steady-state error and settling times are short after the disturbance events have occurred. In motor control applications, load torque is considered as a disturbance. For example, a 250 millisecond transient simulation where a load torque of 0.5 N·m is used for the first 150 milliseconds, and then step load inputs of 1 N·m and 2 N·m are introduced at 150 ms and 200 ms respectively. These step load inputs thus create disturbance events. Accordingly, FIG. 4 shows the load torque profile described here, and FIG. 5 displays transient simulation results for $\omega_r$ and $i_d$ while using this load torque profile.

Figure 5:
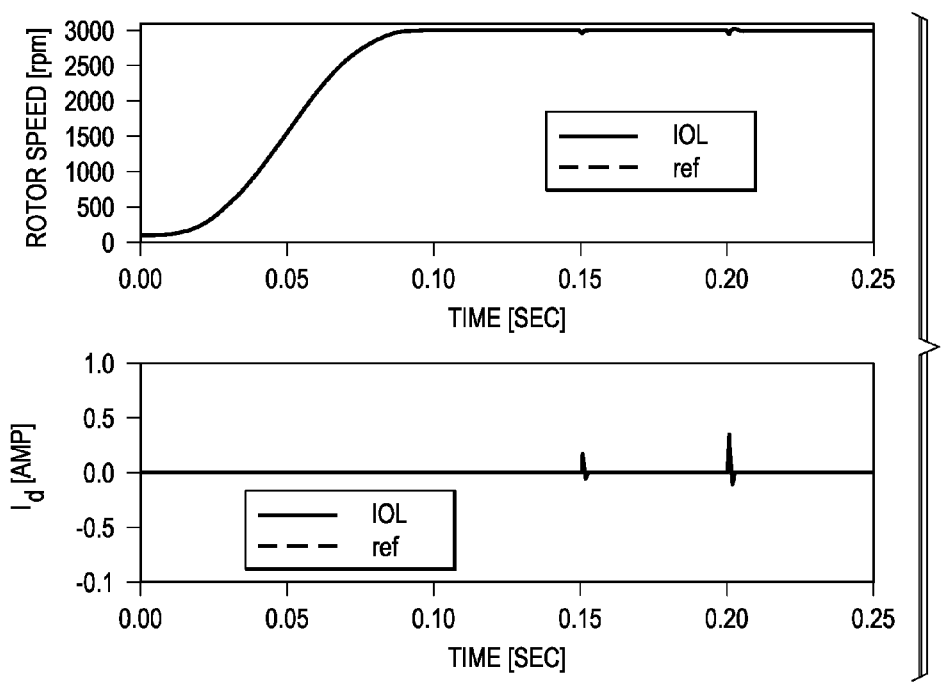
FIG. 5 comprises a diagram of rotor speed $\omega_r$ and current $i_d$ with disturbance rejection for given load torque profile for a disturbance rejection simulation of a motor control approach as configured in accordance with various embodiments of the invention.

In the plots in FIG. 5, actual rotor speed $\omega_r$ and current $i_d$ are laid on top of their desired reference command profiles. It can be seen that exact tracking is achieved for the entire simulation except for the small transients when disturbances are introduced. Because the overshoot in rotor speed $\omega_r$ is extremely small and there are no undesired oscillations in $\omega_r$ or $i_d$ when disturbances are introduced, the control system is seen as having great disturbance rejection properties.

Figure 6:
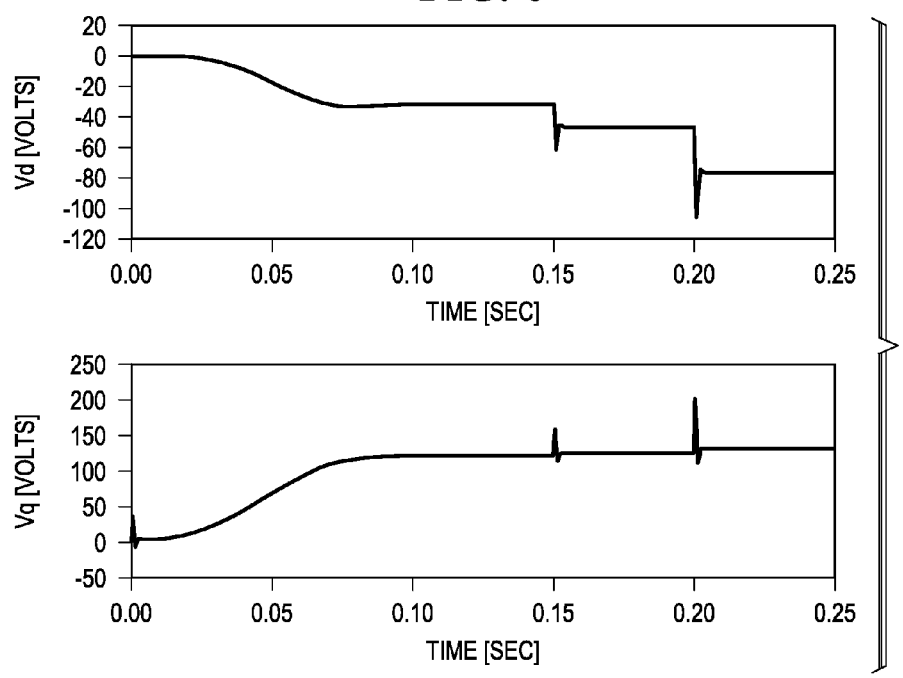
FIG. 6 comprises a diagram of control efforts $v_d$ and $v_q$ with disturbance rejection for given load torque profile for a disturbance rejection simulation of a motor control approach as configured in accordance with various embodiments of the invention.

For reference, FIG. 6 shows the corresponding control efforts $v_d$ and $v_q$ required to follow the desired reference command profiles for $\omega_r$ and $i_d$ while exhibiting disturbance rejection. Because the load of the system is increasing due to disturbances at 150 ms and 200 ms, one would expect that the control effort increases as seen in FIG. 6.

One way to exhibit the controller's robustness against parameter uncertainty would be to introduce uncertainty in the controller and compare simulation results for different levels of uncertainty. Let $J_{exact}$ be the exact (rotor+load) inertia of the actual system and $J_{control}$ be the approximate value of $J_{exact}$. In real-world implementations, $J_{control}$ is usually known through motor datasheets and other preliminary calculations. Recall that $J_{control}$ will be used in $b_2$ (t) from the speed IOL control law, which is where the uncertainty lies. For simulation purposes, $J_{control}$ is varied from $J_{exact}$ to 2× $J_{exact}$, while load torque $T_1$ is kept constant at 0.5 N·m.

Figure 7:
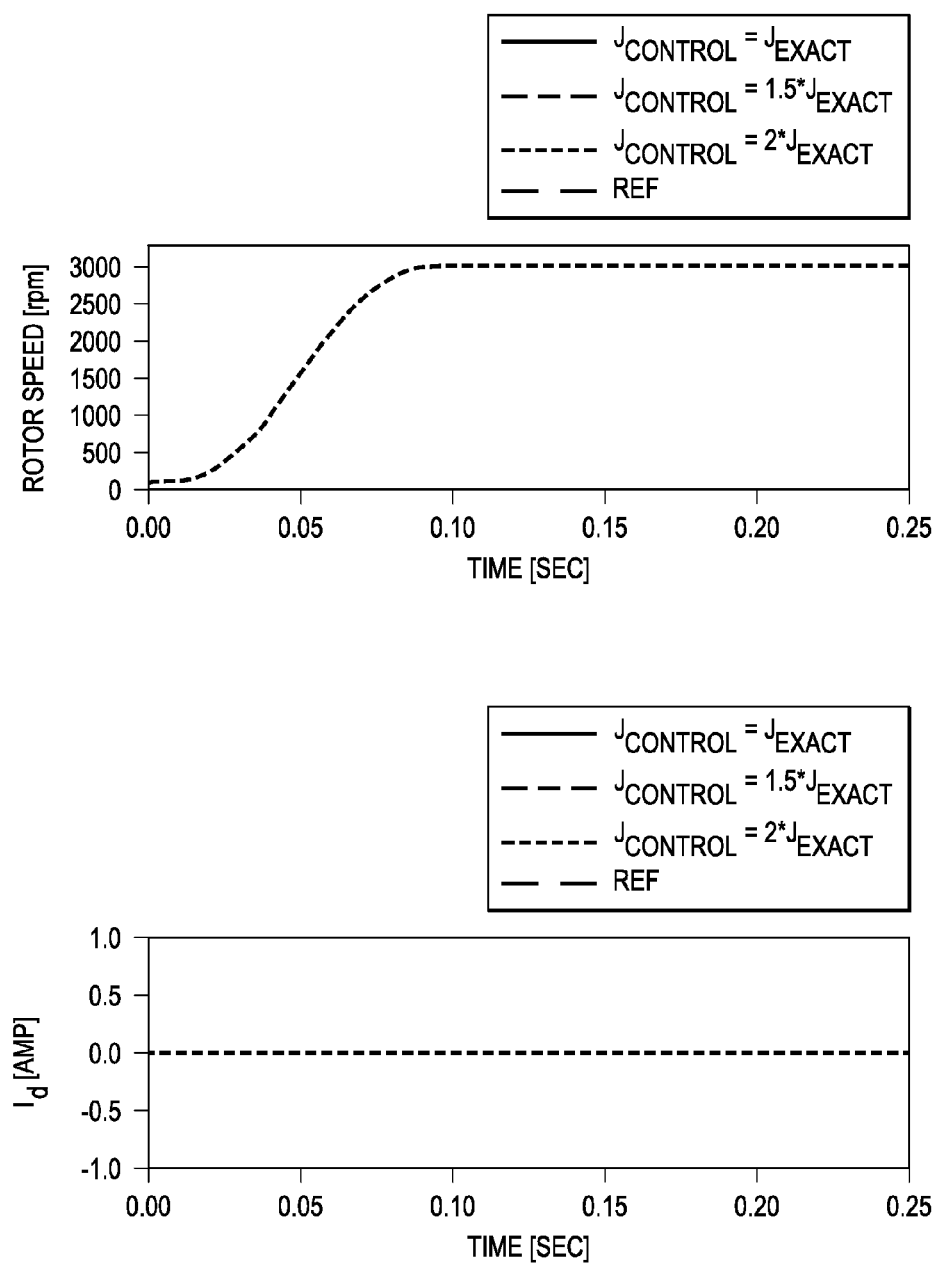
FIG. 7 comprises a diagram of rotor speed $\omega_r$ and current $i_d$ for parameter uncertainty in (rotor+load) inertia J for a disturbance rejection simulation of a motor control approach as configured in accordance with various embodiments of the invention.

It can be seen from FIG. 7 that transient performance for both levels of uncertainty ($1.5 \times J_{exact}$ and $2 \times J_{exact}$) is almost exactly the same as one with no uncertainty. Hence, it would be safe to assume that the control system is robust against parameter uncertainties. Similar simulations can be developed to demonstrate robustness against other parameter uncertainties such as R, $L_d$, $L_q$, etc.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

LIST OF SYMBOLS $\theta_r$: Mechanical rotor position
$\omega_r$: Mechanical rotor speed
$i_d$: d-axis current
$i_q$: q-axis current
$L_d$: d-axis inductance
$L_q$: q-axis inductance
$v_d$: d-axis voltage
$V_q$: q-axis voltage
J: Inertia (rotor+load)
$T_e$: Electromagnetic torque
$T_f$: Friction torque
$T_l$: Load torque
R: Stator resistance
P: Number of poles
$\lambda_{af}$: Flux linkage between permanent magnets and stator phases
$K_T$: Torque constant
$\omega_{c1}$: Current controller (IOL) bandwidth
$\omega_{o1}$: Current observer (ESO) bandwidth
$\omega_{c2}$: Speed controller (IOL) bandwidth
$\omega_{o2}$: Speed observer (ESO) bandwidth

What is claimed is:

1. An apparatus comprising:
   an input configured to receive information from at least one current sensor configured to sense current in at least one current path to a permanent magnet synchronous motor;
   a processing device connected to receive the information from the input regarding the current in the at least one current path and configured to send signals to control operation of the permanent magnet synchronous motor, the processing device configured to:
   receive a bandwidth value; and
   determine at least one gain value based at least in part on the bandwidth value;
   determine operating parameters for the motor based at least in part on the at least one gain value and the information from the at least one current sensor regarding the current in the at least one current path using field oriented control by applying input-output linearization with an extended state observer feedback;
   effect sending control signals based on the operating parameters to a control circuit to control operation of the motor.

2. The apparatus of claim 1 wherein the processing device is further configured to determine operating parameters for the permanent magnet synchronous motor by:
   implementing one input-output linearization speed controller to output a speed control value using a reference rotational speed and speed extended state observer feedback, and
   implementing a input-output linearization current controller to output a current control value using a reference d-axis current and current extended state observer feedback.

3. The apparatus of claim 1 wherein the processing device is further configured to determine operating parameters for the permanent magnet synchronous motor by implementing one input-output linearization speed controller to output a speed control value and implementing a input-output linearization current controller to output a current control value.

4. The apparatus of claim 3 wherein the processing device is further configured to implement the one input-output linearization speed controller to output a speed control value by receiving information regarding a reference speed and feedback from an extended state observer speed module of the processing device.

5. The apparatus of claim 4 wherein the processing device's extended state observer speed module is configured to receive feedback information regarding motor speed and control signals from the one input-output linearization speed controller and to provide extended state observer outputs as the feedback to the one input-output linearization speed controller.

6. The apparatus of claim 3 wherein the processing device is further configured to implement the input-output linearization current controller to output a current control value by receiving information regarding a reference current and feedback from an extended state observer current module.

7. The apparatus of claim 6 wherein the processing device's extended state observer current module is configured to receive feedback information regarding d-axis current and control signals from the input-output linearization current controller and to provide extended state observer outputs as the feedback to the input-output linearization current controller.

8. The apparatus of claim 1 wherein the processing device is further configured to determine the at least one gain value based at least in part on the bandwidth value by selecting observer gains such that a characteristic polynomial for an extended state observer speed module has all positive and real coefficients by placing all poles at an extended state observer bandwidth.

9. A method comprising:
   receiving by a processing device information from at least one current sensor regarding current in at least one current path to a permanent magnet synchronous motor;
   determining by the processing device at least one gain value based at least in part on a bandwidth value;
   determining by the processing device operating parameters for the permanent magnet synchronous motor based at least in part on the at least one gain value and the information from the at least one current sensor regarding the current in the at least one current path using field oriented control by applying input-output linearization with an extended state observer feedback;
   the processing device effecting sending control signals based on the operating parameters to control operation of the permanent magnet synchronous motor.

10. The method of claim 9 wherein the processing device determining operating parameters for the permanent magnet synchronous motor further comprises:
    implementing one input-output linearization speed controller to output a speed control value using a reference rotational speed and speed extended state observer feedback, and implementing a input-output linearization current controller to output a current control value using a reference d-axis current and current extended state observer feedback.

11. The method of claim 9 wherein the processing device determining operating parameters for the permanent magnet synchronous motor further comprises implementing one input-output linearization speed controller to output a speed control value and implementing a input-output linearization current controller to output a current control value.

12. The method of claim 11 wherein the implementing the one input-output linearization speed controller to output a speed control value comprises receiving information regarding a reference speed and feedback from an extended state observer speed module.

13. The method of claim 12 wherein the extended state observer speed module receives feedback information regarding motor speed and control signals from the one input-output linearization speed controller and provides extended state observer outputs as the feedback to the one input-output linearization speed controller.

14. The method of claim 11 wherein the implementing the input-output linearization current controller to output a current control value comprises receiving information regarding a reference current and feedback from an extended state observer current module.

15. The method of claim 14 wherein the extended state observer current module receives feedback information regarding d-axis current and control signals from the input-output linearization current controller and provides extended state observer outputs as the feedback to the input-output linearization current controller.

16. The method of claim 9 wherein determining by the processing device at least one gain value based at least in part on a bandwidth value comprises selecting observer gains such that a characteristic polynomial for an extended state observer speed module has all positive and real coefficients by placing all poles at an extended state observer bandwidth.

17. The method of claim 9 wherein determining by the processing device at least one gain value based at least in part on a bandwidth value comprises selecting input-output controller gains such that a characteristic polynomial for an input-output linearization control module has all positive and real coefficients by placing all poles at an input-output linearization control module bandwidth.

18. A method comprising:
receiving by a processing device information from at least one current sensor regarding current in at least one current path to a permanent magnet synchronous motor;
determining by the processing device at least one gain value based at least in part on a bandwidth value by selecting observer gains such that a characteristic polynomial for an extended state observer speed module has all positive and real coefficients by placing all poles at an extended observer state bandwidth;
determining by the processing device operating parameters for the permanent magnet synchronous motor using field oriented control based at least in part on the at least one gain value and the information from the at least one current sensor regarding the current in the at least one current path by:
  implementing one second-order input-output linearization speed controller to output a speed control value, the one second-order input-output linearization speed controller receiving information regarding a reference speed and feedback from an extended state observer speed module, wherein the extended state observer speed module receives feedback information regarding motor speed and control signals from the one second-order input-output linearization speed controller and provides extended state observer outputs as the feedback to the one second-order input-output linearization speed controller, and
  implementing a single-order input-output linearization current controller to output a current control value, the single-order input-output linearization current controller receiving information regarding a reference current and feedback from an extended state observer current module, wherein the extended state observer current module receives feedback information regarding d-axis current and control signals from the single-order input-output linearization current controller and provides extended state observer outputs as the feedback to the single-order input-output linearization current controller;
the processing device effecting sending control signals based on the operating parameters to control operation of the permanent magnet synchronous motor.

\* \* \* \* \*